(12) United States Patent
Sheehy et al.

(10) Patent No.: US 6,221,405 B1
(45) Date of Patent: Apr. 24, 2001

(54) METHOD OF BONDING AND TENDERIZING MEAT

(75) Inventors: Roger C. Sheehy, Goffstown; José L. Prego, Nashua, both of NH (US); Monty N. Wooster, Lincoln, NE (US)

(73) Assignee: Jac Pac Foods, Ltd., Manchester, NH (US)

( * ) Notice: Subject to any disclaimer, the term of this patent is extended or adjusted under 35 U.S.C. 154(b) by 0 days.

(21) Appl. No.: 09/309,953

(22) Filed: May 11, 1999

(51) Int. Cl.[7] .............................. A23B 4/20; A23L 1/318
(52) U.S. Cl. ............................ 426/56; 426/58; 426/59; 426/641
(58) Field of Search .................. 426/56, 58, 59, 426/641

(56) References Cited

U.S. PATENT DOCUMENTS 5,512,015 * 4/1996 Teran ............................ 426/56

FOREIGN PATENT DOCUMENTS

2086748 * 3/1990 (JP) ............................ 426/56

* cited by examiner

*Primary Examiner*—Helen Pratt
(74) *Attorney, Agent, or Firm*—Shook, Hardy & Bacon LLP

(57) ABSTRACT

The method of bonding and tenderizing separate portions of meat to enhance its value. The method is to applying a suitable bonding compound to separate portions of meat and bonding the portions together in a mold at refrigerated temperatures. Tenderization is controlled through the manipulation of the meat's internal temperature and the time during which it is exposed to the cooking process.

10 Claims, 2 Drawing Sheets

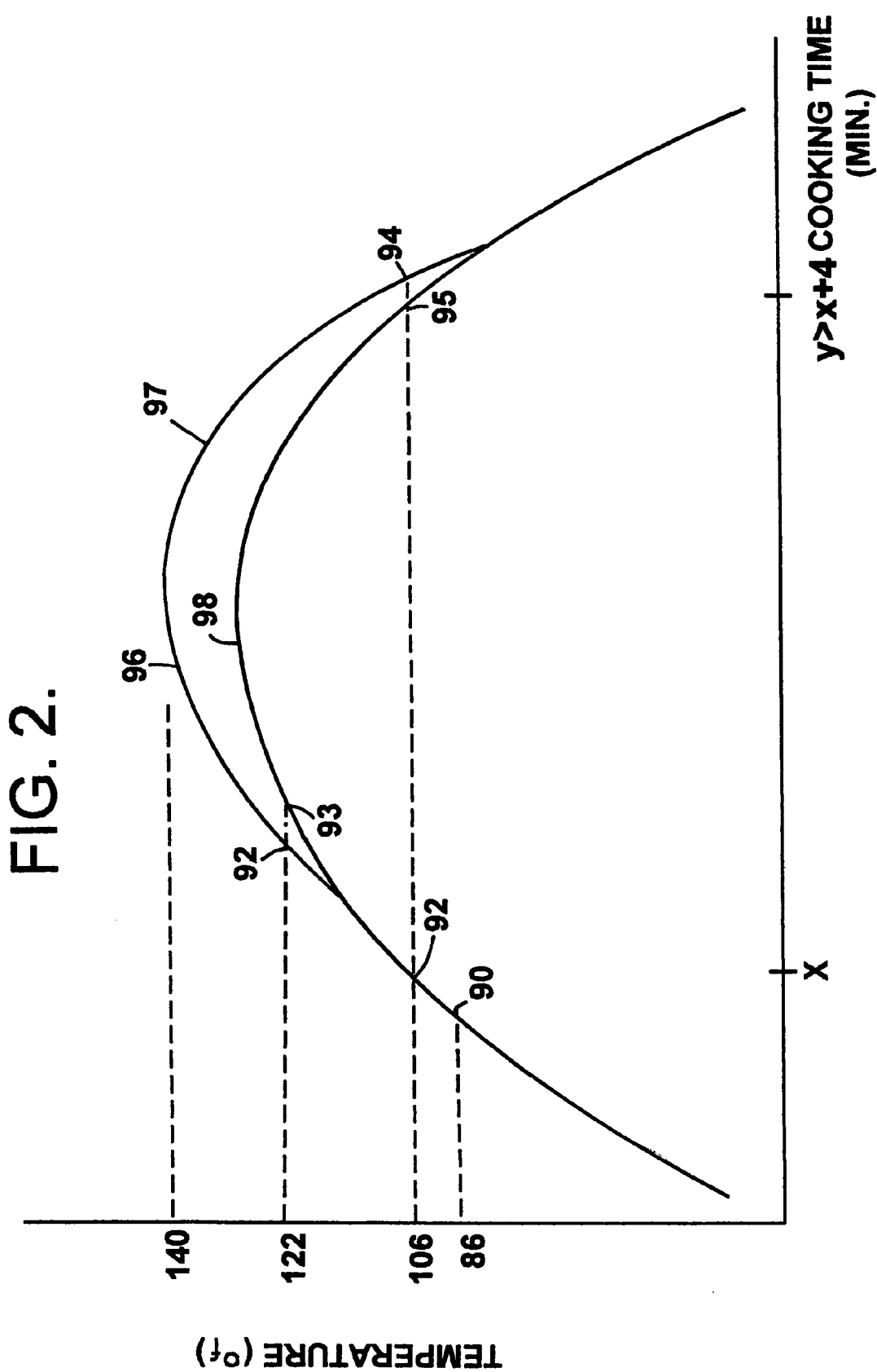

METHOD OF BONDING AND TENDERIZING MEAT

FIELD OF THE INVENTION

The present invention relates to the field of portioned meat products. More particularly, the present invention relates to the selective bonding of meat portions to increase and enhance the quality of the original meat portion.

BACKGROUND OF THE INVENTION

As is well known in the art the price and value attached to a portioned meat product will vary considerably depending on the cut of the meat and the quality of that meat. Often times the quality of meat is judged according to, among other things, the fat content or marbling in the meat. The degree of marbling in any piece of meat may vary substantially even in meat from the same animal. For instance, it is well known in the art that a rib eye is a long rectangular cut taken from a front shoulder of an animal. The rib eye is then sliced into individual portions which are sold to the consumer. The fat content in the rib eye varies considerably from one end of the cut to the other. For instance, a large portion of fat found in rib eye steaks, known as the star fat or kernel fat occupies a substantial portion of the meat toward the chuck end of the animal. As you move away from the chuck end along the rib eye, the meat becomes more valuable as the size of the kernel fat decreases. A method of selectively removing undesirable fat and bonding the meat back together in a seamless way would enhance the quality and value of the meat.

A porterhouse cut of beef typically contains a T-bone with meat on either side of the long bone portion. On one side is the strip and on the other is the tenderloin. The porterhouse, like the rib eye, extends along the animal's rib from neck toward the rear portion of the animal. The tenderloin portion, which is the most desirable and hence most valuable, is thinnest closer to the head of the animal and gets thicker as you move toward the rear. A method of bonding tenderloin onto porterhouse portions with little or no tenderloin section would greatly enhance the quality of value of the porterhouse cut.

It is also well known in the art that during the cutting of meat from the animal's bone there are several small portions of scrap meat which are usually discarded. A method of aggregating those various scrap pieces of meat in a solid portion would greatly enhance the value currently lost as the scrap is discarded. There have been prior attempts in the prior art to solve these problems. U.S. Pat. No. 4.539,210 ("O'Connell, et al.") describes a process for making a structured meat product. In the O° Connell process, the meat product is comprised of chunks of comminuted meat. The comminuted meat chunks are then multiply severed and massaged under reduced pressure to produce a protein exudate on the chunks. The protein exudate comprised of intercellular protein, acts as a binding mechanism to adhere the chunks of meat together. A disadvantage of this process is that adhering, comminuted or chunk meat produces a different texture or organoleptic experience than does solid meat. For this reason, the process described in O'Connell does not produce a satisfactory whole meat product. Exemplary including U.S. Pat. No. 3,563,764 to Posegate and U.S. Pat. No. 3,076,713 to Mass teach the bonding of individual meat pieces through a combination of comminuted meat chunks and a metallic salt. The metallic salt extracts the intercellular protein and forms a bonding material which is creamy or sticky in appearance. Again, both of these processes produce a meat product which is texturally different than whole meat, producing a less desirable organoleptic experience and selling for comparably lower prices. Others in the art may use sodium tripolyphosphate as a binder for chunked or macerated meat. With such a binder the sodium triphyphosphate tends to make the meat rubbery as it cooks and alters the textural feel in the mouth resulting in a different and often unacceptable organoleptic experience.

It is further known in the art that there are several compounds which may be used which will bond meat portions together without changing the textural or flavor characteristics of the meat. One such chemical is trans-glutaminase sold under the trademark Activa TG® and manufactured by Amano Pharmaceutical Company, Ltd., Nagoya, Japan. The second chemical is Fibrinogen concentrate from animal plasma, sold under the trademark Fibrimex® manufactured by Harminex-Ligos B.V. of the Netherlands. It has been found that these two bonding agents are optimally preferred for bonding meat products. A known problem encountered in using the transglutaminase is that the bond tends to break down if tenderizing compounds are added to the meat.

U.S. Pat. No. 5,387,424 to Mendenhall teaches the bonding of meat portions to bone containing a thin layer of meat through the use of a salt and phosphate mixture. However, the salt/phosphate mixture used significantly alters the textural appearance and taste of the meat.

What is needed is a process of bonding meat whereby less valuable cuts of meat may be value enhanced by bonding different cuts of meat to the existing whole meat portion without altering the organoleptic feel and without altering the effectiveness of bonding after using tenderizing compounds.

SUMMARY OF THE INVENTION

In accordance with the principles of the present invention, a method of bonding and chemically tenderizing meat is provided. The method of the present invention comprises applying a suitable bonding compound to different sections of whole meat and treating the bonded meat with tenderizing compounds under a predetermined temperature-time profile such that tenderizing compounds do not interfere with the bonding between the two sections of meat.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

FIG. 2 is graphical representation of the temperature-time profile for cooked meat.

DETAILED DESCRIPTION OF THE PREFERRED EMBODIMENT(S)

Figure 1:
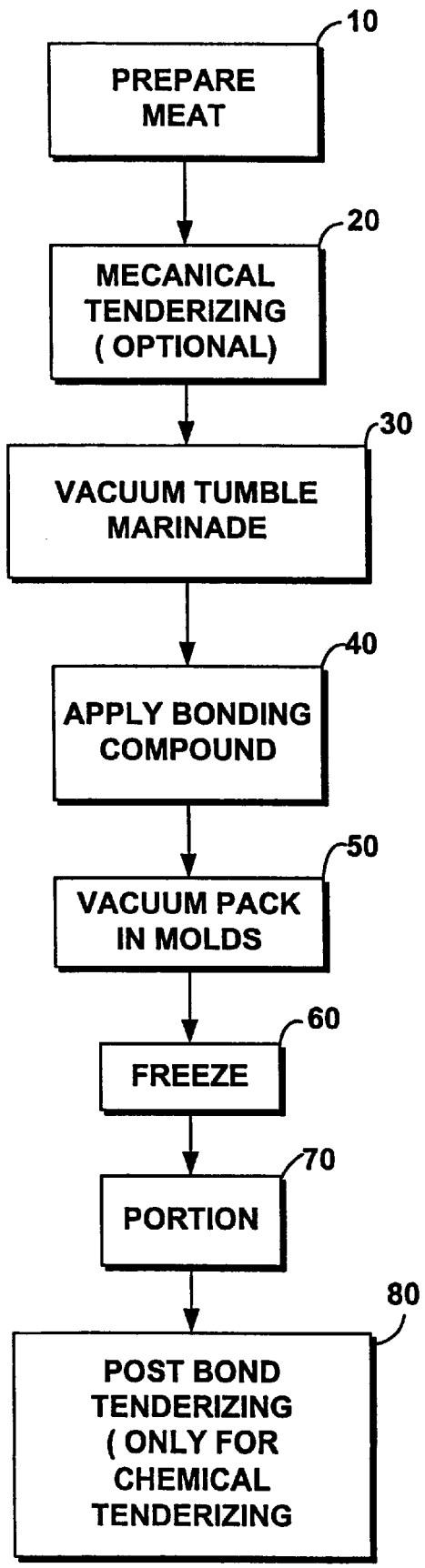
FIG. 1 is a flow chart depicting the present invention.

The process of enhancing the value of cuts of meat through bonding and tenderizing in accordance with the principles of the present invention is performed through a process outlined in FIG. 1.

Referring now to FIG. 1, meat is prepared to be bonded and tenderized at step 10. Lower grade meat pieces are assembled, skinned, trimmed and denuded of all sinew. After the meat has been prepared, the meat may optionally be mechanically tenderized at step 20. Needle tenderization is the preferred process. The most preferred mechanical tenderization is through the use of a Ross Tender Press™ manufactured by Ross Industries, Inc. of Midland, W.Va. Depending on the type of final product desired, the meat portions may be cut into smaller manageable pieces. For example, if the desired end product is a sandwich meat or other composite meat product, the size of the meat chunks will vary from very small to very large depending on the desired end product. The larger the chunks of meat, the more whole muscle integrity the final product will have. This will result in a positive organoleptic experience for the end user, reduce cross-training of the meat, and impart a natural mouth feel to the final product.

After the meat is prepared, skinned and optionally mechanically tenderized, the meat is preferably vacuum tumbled in marinade at step 30. The amount of marinade added to the tumbling process is preferably between about 10% by weight of meat to about 35% by weight. Most preferably the amount of marinade added varies between about 16% by weight to about 20% by weight. The amount of marinade added will depend on the desired characteristics of the final product. Practitioners will know how to optimize the desired characteristics through addition of marinade to produce both favorable yield numbers and meet any customer driven flavor attributes. The meat is preferably vacuum tumbled for between about 15 to about 60 minutes. Most preferably the meat is vacuum tumbled for between about 30 to about 40 minutes. Again, the optimum preparations of marinade and tumbling time will be decided based on the individual characteristics desired by the customer.

The bonding compound is then applied to the meat to adhere it to the other portions of meat at step 40. The preferred bonding compounds include FIBRIMEX® brand fibrinogen concentrate from animal plasma and ACTIVA® TG brand transglutaminase. If FIBRIMEX® brand fibrinogen concentrate is chosen it should be applied in amounts of approximately 3% to 9% by weight of the meat to be bonded. If ACTIVA® TG brand transglutaminase is used as the preferred binder, then less than 1.3% of binder by weight of meat must be used. After application of a suitable binder, the pieces desired to be bonded must be vacuum packed in a mold or box at step 50 and allowed to knit for a period of at least about eight hours under refrigerated conditions of between about 33° F. and about 43° F.

After the eight hour knitting period has been completed, the bonded meat is then frozen prior to portioning and held a minimum of about ten hours to ensure the bond between the two portions of meat is suitably strong at step 60. Most preferably the meat is frozen for at least about 12 hours of holding time to produce the best bond.

The next step of the process involves portioning of the meat product which is best determined by one of skill in the art depending on the proportions specified by the customer or the use of the meat 70. Optionally, one may choose to add additional glazes or flavor toppings after portioning but prior to customer packaging. In the case where ACTIVA® TG brand transglutaminase is used as the bonding agent, an additional post-portioning step must be added in order to ensure the correct amount of tenderizer is applied to the meat product. This step is different than in the case of using ACTIVA® TG brand transglutaminase as ACTIVA® TG brand transglutaminase reacts with tenderizers and results in little if any bonding. FIBRIMEX® brand fibrinogen on the other hand appears to bond well even in the presence of tenderizers.

It has been found that by using this process, a seamless bond between two meat portions may be accomplished and maintained even through a vigorous cooking process. Surprisingly, it has been found that the tenderization begins to take effect from the time the frozen meat product is thawed rather than the time during which the tenderizer 80 is applied as had been previously thought. The tenderization continues throughout the cooking process. It has been found that over tenderization of bonded meat results in a breakdown of the bond between the two meat portions, as well as a mushy, organoleptic texture. The tenderization of the meat begins to take place as the proteolitic enzymes are activated and deactivated between different temperatures. The preferred tenderizers, Bromelain and Ficin, are both proteolitic enzymes derived from natural sources, pineapples and fig trees respectively, which function to break down protein. Bromelain and Ficin are known to activate at approximately 86° F. and 122° F. respectively and deactivate at approximately 140° F. and 122° F. respectively. Both Bromelain and Ficin are preferably used in combination to produce the best tenderizing result on the bonded meat. The tenderizing compound may be applied either through a dip or a spray process. As one of skill in the art will easily see, the simple manipulation of the temperature time curve will ensure that proper tenderization takes place without breaking down of the bond between the two meat portions.

The last step in the process is the cooking process. Because of the unexpected advantages of this process, bonded meat may be cooked either from a frozen state or from a thawed state without a breakdown in the bond.

Referring now to FIG. 2, a graph depicting the temperature time profile for cooked meat containing tenderizers is presented. Two different cooking profiles 97 and 98 are depicted on the axes. On the lower curve 98, points 90, 91, 93 and 95 depict the temperature time profile for a meat using the tenderizer Bromelain. The upper curve 97 depicts the temperature time profile for cooked meat that has been tenderized with Ficin, using points 90, 91, 92, 96 and 94. Referring now to the Bromelain temperature time profile, 97 meat is heated during the cooking process until it reaches approximately 86° F. at which time the Bromelain is thermally activated and begins tenderizing the meat at point 90. The internal temperature of the meat continues to increase until it reaches approximately 106° F., at which point cooking of the meat begins at point 91. It is well known in the art that the internal temperature of the meat must remain at or above 106° F., for over four minutes in order for the meat to be properly cooked, represented on FIG. 2 as the time distance between points 91 and 95.

The second curve 97 represented by points 91, 92, 96, 94 shows the temperature time profile for a meat tenderized using Ficin tenderizer. Again on this curve, cooking begins at 106° F., which corresponds to point 91 on curve 97. However, because of the higher activation temperature of Ficin, the tenderizer itself is not activated until 122° F. at point 92. Again, the cooking proceeds from point 91 to point 94 while the internal temperature of the meat is at or above 106° F. As one of skill in the art can see, tenderization under both of these temperature time profiles only occurs from point 90 to point 93 on the Bromelain curve 98 and point 92 to point 96 on the Ficin curve 97. Proper manipulation of the cooking time versus the tenderization time prevents the disintegration of the bond between the two meat portions.

The method herein described may be equally applied to poultry, fish, and pork with appropriate adjustments to the temperature-time profile.

Having described the preferred embodiments of this invention, it will now come apparent to those skilled in the art that embodiments incorporating its concepts may be provided. It is felt therefore, that this invention should not be limited to the disclosed invention but should be limited only by the spirit and scope of the appended claims.

What is claimed is:

1. A method of preparing and tenderizing a bonded meat product, comprising the steps of:

preparing at least two separate meat portions to be bonded together;

applying a binder to said meat portions;

vacuum packing the meat portions with said applied binder in a mold for a period of time sufficient to allow at least partial bonding together of said meat portions to form a bonded meat product;

freezing the bonded meat product at one or more preselected freezing temperatures;

applying to the bonded meat product a tenderizer which activates at an activation temperature above said preselected freezing temperature, said tenderizer being applied while the bonded meat product is at a temperature below said activation temperature;

then warming said frozen bonded meat product to one or more temperatures above said activation temperature to cause thawing of the bonded meat product and activation of said tenderizer; and maintaining said thawed bonded meat product at said one or more temperatures for a period of time sufficient to cause thawing and tenderization of the bonded meat product without breaking down said bonding of the meat portions.

2. The method of claim 1, wherein said step of applying a binder comprises applying tranglutaminase.

3. The method of claim 2, including the step of portioning the bonded meat product after said freezing of the bonded meat product.

4. The method of claim 3, including the step of packaging the bonded meat product after said portioning of the bonded meat product.

5. The method of claim 4, including the step of mechanically tenderizing the meat portions prior to said step of vacuum packaging.

6. The method of claim 4, including the step of cooking said thawed bonded meat product.

7. The method of claim 2, wherein said step of applying a tenderizer comprises applying bromelain and/or ficin.

8. The method of claim 2, wherein said step of applying a binder comprises applying said tranglutaminase and fibrinogen concentrate.

9. The method of claim 2, wherein said fibrinogen concentrate is applied in amounts of between about 3% and about 9% by weight of the meat portions.

10. The method of claim 2, wherein said tranglutaminase is applied in an amount of less than 1.5% by weight of the meat portions.

* * * * *